(12) United States Patent
Rofougaran

(10) Patent No.: US 8,160,168 B2
(45) Date of Patent: Apr. 17, 2012

(54) METHOD AND SYSTEM FOR EFFICIENT TRANSMISSION AND RECEPTION OF RF ENERGY IN MIMO SYSTEMS USING POLAR MODULATION AND DIRECT DIGITAL FREQUENCY SYNTHESIS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/099,487

(22) Filed: May 3, 2011

(65) Prior Publication Data

US 2011/0206149 A1 Aug. 25, 2011

Related U.S. Application Data

(63) Continuation of application No. 11/679,967, filed on Feb. 28, 2007, now Pat. No. 7,936,833.

(51) Int. Cl.
*H04K 1/10* (2006.01)
*H04L 27/28* (2006.01)

(52) U.S. Cl. .......... 375/260; 375/219; 375/267; 331/46; 331/48

(58) Field of Classification Search .................. 375/219, 375/260, 267; 331/46, 48
See application file for complete search history.

(56) References Cited

U.S. PATENT DOCUMENTS

| | | |
|---|---|---|
| 5,031,131 A | 7/1991 | Mikos |
| 5,598,437 A | 1/1997 | Gourse |
| 6,078,628 A | 6/2000 | Griffith et al. |
| 7,023,368 B1 * | 4/2006 | Sheng et al. ............ 341/141 |
| 7,440,987 B1 | 10/2008 | Song et al. |
| 2003/0142726 A1 * | 7/2003 | Eltawil et al. ............ 375/146 |
| 2004/0017847 A1 | 1/2004 | Alberth, Jr. et al. |
| 2004/0184559 A1 | 9/2004 | Ballantyne |
| 2006/0026657 A1 | 2/2006 | Kuhlmann et al. |
| 2006/0125687 A1 | 6/2006 | Greeley |
| 2007/0087770 A1 | 4/2007 | Gan |
| 2007/0091988 A1 * | 4/2007 | Sadri et al. ............ 375/219 |

* cited by examiner

*Primary Examiner* — Curtis Odom
(74) *Attorney, Agent, or Firm* — Farjami & Farjami LLP

(57) ABSTRACT

A first oscillating signal may be generated via a first direct digital frequency synthesizer of a communication device. One or more second oscillating signals may be generated via one or more second direct digital frequency synthesizers of the communication device. Signals received via a plurality of antennas may be processed utilizing the first oscillating signal. Signals to be transmitted via the plurality of antennas may be processed utilizing the first oscillating signal and the one or more second oscillating signals. The communication device may comprise a plurality of receive channels, a plurality of transmit channels, and a multiplexer. The first oscillating signal may be coupled, via the multiplexer, to the plurality of receive paths and one of the transmit paths. During time intervals in which the communication device is configured to receive signals via the plurality of antennas, the multiplexer may route the first oscillating signal to the first one or more direct digital frequency synthesizers.

20 Claims, 7 Drawing Sheets

METHOD AND SYSTEM FOR EFFICIENT TRANSMISSION AND RECEPTION OF RF ENERGY IN MIMO SYSTEMS USING POLAR MODULATION AND DIRECT DIGITAL FREQUENCY SYNTHESIS

CROSS-REFERENCE TO RELATED APPLICATIONS/INCORPORATION BY REFERENCE

This application is a continuation of U.S. patent application Ser. No. 11/679,967 filed on Feb. 28, 2007.

The above-stated application is hereby incorporated herein by reference in its entirety.

FIELD OF THE INVENTION

Certain embodiments of the invention relate to wireless communication. More specifically, certain embodiments of the invention relate to a method and system for efficient transmission and reception of RF energy in MIMO systems using polar modulation and direct digital frequency synthesis.

BACKGROUND OF THE INVENTION

In most current wireless communication systems, nodes in a network may be configured to operate based on a single transmit and a single receive antenna. However, for many of these current wireless systems, the use of multiple transmit and/or receive antennas may result in an improved overall system performance. These multi-antenna configurations may be utilized to reduce the negative effects that multi-path and/or signal interference may have on signal reception. Existing systems and/or systems which are being currently deployed, for example, CDMA-based systems, TDMA-based systems, WLAN systems, and OFDM-based systems such as IEEE 802.11 a/g/n, may benefit from configurations based on multiple transmit and/or receive antennas. It is anticipated that multiple antenna techniques may be increasingly utilized in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by, among other things, increased power consumption, increased size, increased complexity, and increased cost. These limitations are a direct result of the need to provide a separate RF chain for each transmit and receive antenna of multi-antenna systems. Each RF receive chain generally comprises a tuner/filter, down-converter, and an analog to digital converter. Each RF transmit chain generally comprises at least one oscillator, modulator, and amplifier. It is therefore apparent that as the number of transmit and receive antennas increases, the size, complexity, power consumption, and overall cost may increase.

As stated above, an RF transmitter may comprise at least one modulator. This modulator may perform a modulation scheme which requires impressing both phase and amplitude information onto a carrier. These modulation schemes have traditionally been performed using quadrature modulation whereby an in-phase carrier (I) and a quadrature carrier (Q) are amplitude modulated and then combined prior to transmission. In this manner, when using quadrature modulation, the amplitude modulation and phase modulation occur simultaneously. From the preceding discussion, it may be seen that quadrature modulation make use of Cartesian coordinates x and y, wherein the x axes is the I (in-phase) axis and the y axis is the Q (quadrature) axis.

In operation, an RF transmitter and/or receiver may require signals at a multitude of frequencies. Traditionally these signals are generated through the use of voltage controlled oscillators (VCO) and phase locked loops (PLL). One drawback of using VCO and PLL for frequency generation is that these circuits have a relatively narrow range of operating frequencies. The narrow range of operation often results in the need for many VCO and/or PLL in a single receiver or transmitter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for efficient transmission and reception of RF energy in MIMO systems using polar modulation and direct digital frequency synthesis, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for efficient transmission and reception of RF energy in MIMO systems using polar modulation and direct digital frequency synthesis. A plurality of carrier signals in a MIMO system may be polar modulated utilizing polar modulation. A direct digital frequency synthesizer may be utilized to phase modulate the plurality of carrier signals. The direct digital frequency synthesizer may be modulated utilizing a single reference clock. The clock may be a single fixed-frequency reference clock. The plurality of carrier signals may be amplitude modulated by controlling a gain of a power amplifier. Aspects of the invention may comprise using polar modulation in a MIMO system to improve, for example, the power efficiency of the system.

Figure 1:
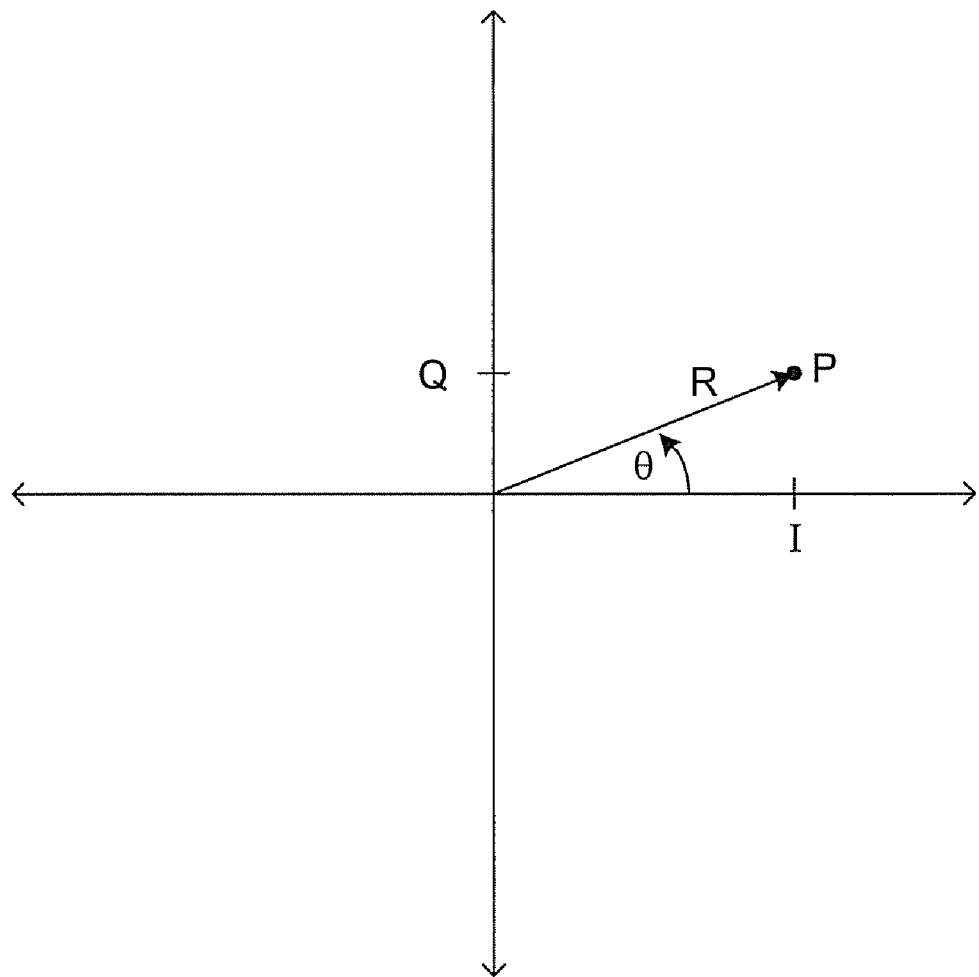
FIG. 1 is graph illustrating the relationship between Cartesian coordinates and polar coordinates, in connection with an embodiment of the invention

FIG. 1 is graph illustrating the relationship between Cartesian coordinates and polar coordinates, in connection with an embodiment of the invention. Polar modulation is related to quadrature modulation in the same way that the polar coordinate system is related to the Cartesian coordinate system. In a Cartesian coordinate system, a point, P, is represented by two signals of amplitudes I and Q respectively. With quadrature modulation it is often difficult to separate phase modulation from amplitude modulation and, as a result, the combined I and Q signal going to an amplifier has non-constant amplitude. Thus, signals generated with quadrature modulation often require linear amplifiers for transmission in order to preserve the integrity of the varying amplitude signal. This need for linear power amplifiers may result in increased power consumption due to the larger conduction angles of linear power amplifiers. Furthermore, quadrature modulation also lead to increased power consumption and increased circuit size due to the need to process two signals, I and Q, in parallel.

In a polar coordinate system the same point, P, is represented by only one signal with magnitude R and a phase θ. Polar modulation makes use of a polar coordinate system, wherein a signal is represented by a magnitude R and a phase θ, allowing phase modulation and amplitude modulation to be performed independently. In this way, a polar modulated signal may be generated with one phase change and one amplitude change of one carrier signal. Conventionally, use of polar modulation been limited by, among other things, inability of frequency generation circuits such as voltage controlled oscillators (VCO) and phase locked loops (PLL) to respond fast enough to phase and frequency changes.

Figure 3:
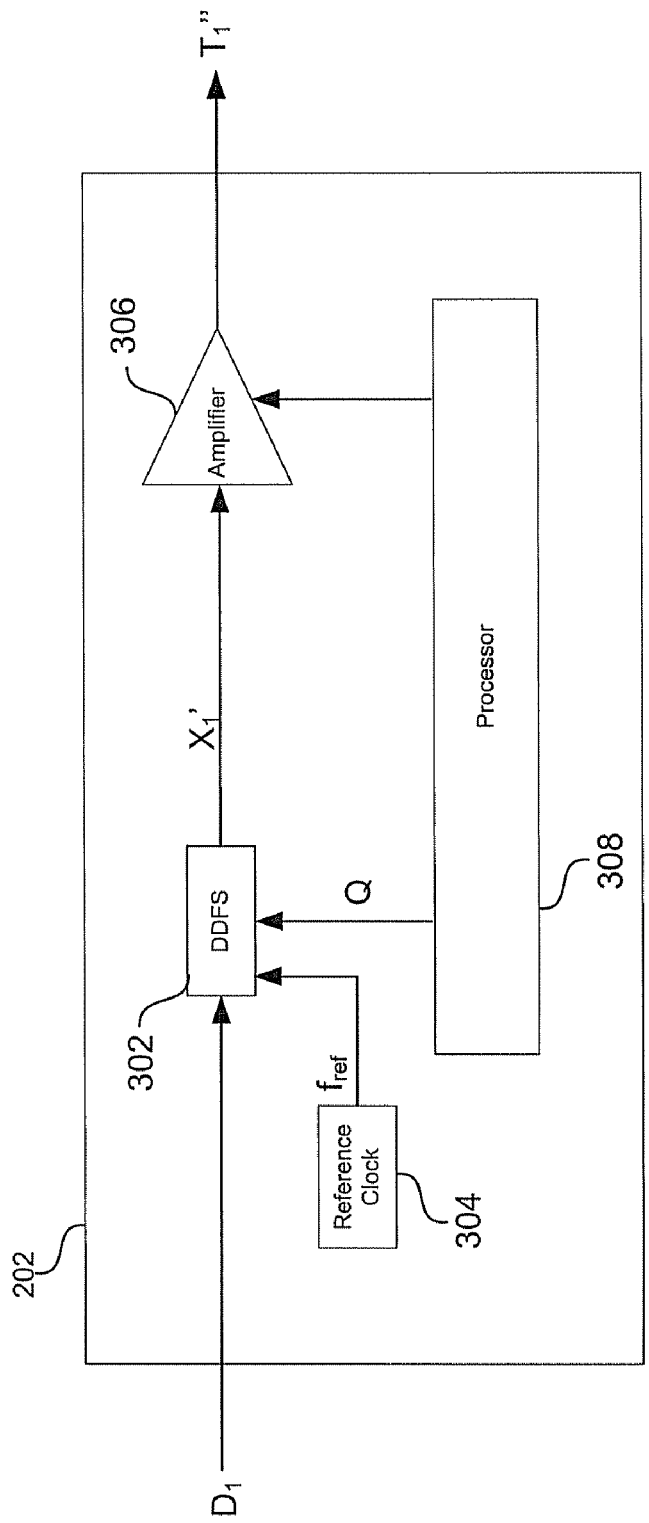
FIG. 3 is a block diagram of a transmitter, in accordance with an embodiment of the invention.

In regards to phase modulating a signal, use of a direct digital frequency synthesizer (DDFS), such as the one described in FIG. 3, may overcome some of the limitations of traditional analog circuits. However, direct digital frequency synthesizers have traditionally been of limited use for RF modulation due to a need for a reference clock that is roughly two times the frequency being generated. In this regard, recent advancements in semiconductor processing technology, including CMOS processes with feature sizes down to 45 nm, have made it possible to generate reference clocks on the order of 10's of GHz and higher. This ability to generate super high frequency clocks enables the DDFS to generate signals on the order 10's of GHz and higher, with accuracy on the order of 1 Hz.

Figure 2:
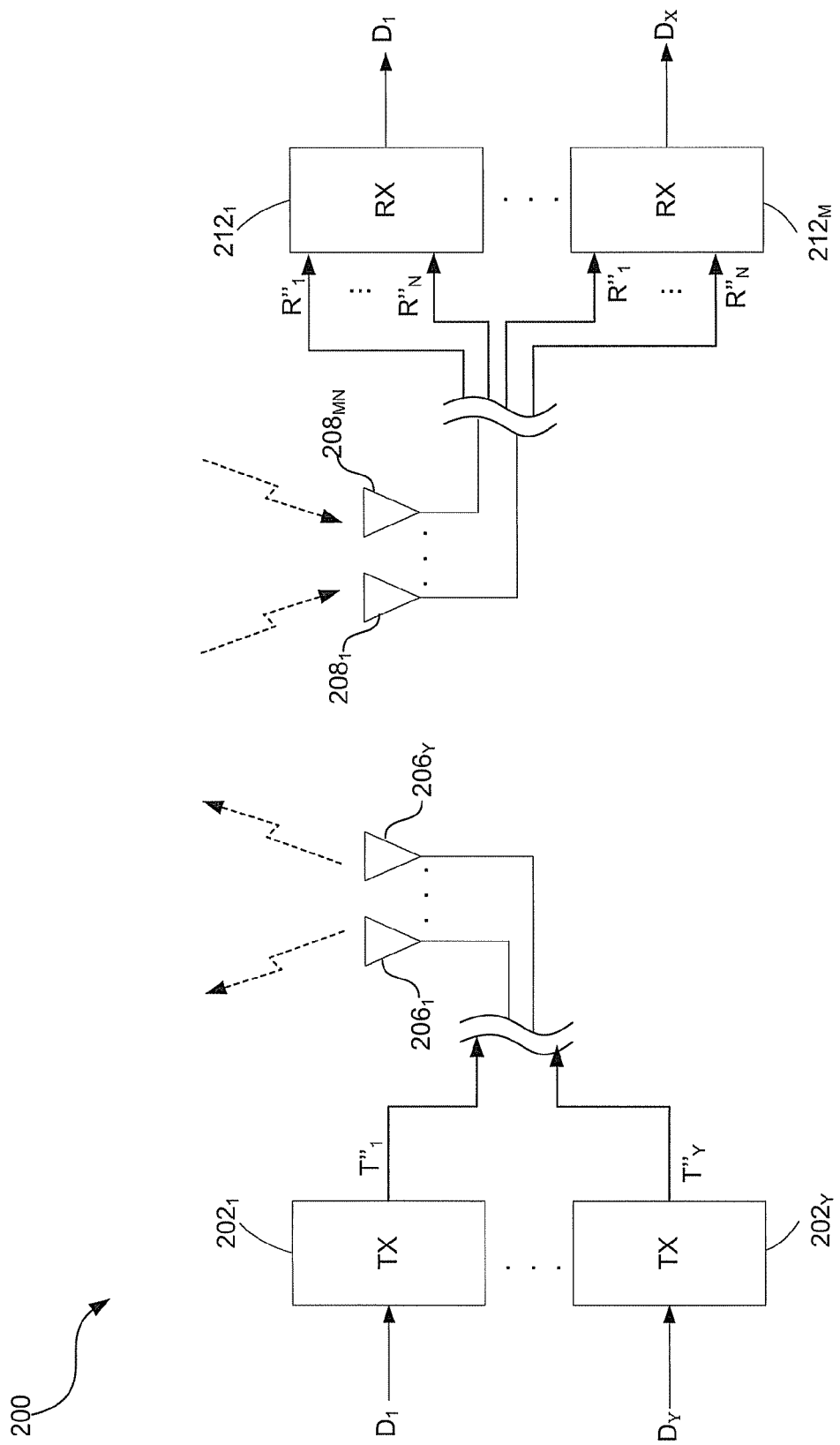
FIG. 2 is a block diagram of a MIMO system, in accordance with an embodiment of the invention

FIG. 2 is a block diagram of a MIMO system 200 in accordance with an embodiment of the invention. Referring to FIG. 2, the MIMO system 200 may comprise one or more RF transmit blocks $202_1 \ldots, 202_Y$, one or more transmit antennas $206_1 \ldots, 206_Y$, one or more RF receive antennas $208_1 \ldots, 208_{MN}$, and one or more RF receive blocks $212_1 \ldots, 212_M$. For example, the system 200 may comprise a number of transmit blocks Y; and each transmit block may output a signal T, which may be transmitted by Y transmit antennas. The system 200 may further comprise a number of receive blocks M, which may receive signals from M×N antennas and each receive block may operate on a number of received signals N and output a data stream $D_i$.

The RF transmit blocks $202_1 \ldots, 202_Y$ may each comprise suitable logic, circuitry and/or code that may enable processing of one or more signals which may then be transmitted. In one embodiment of the invention, the RF transmit blocks $202_1 \ldots, 202_Y$ may comprise a direct digital frequency synthesizer which may be utilized to phase modulate one or more signals. Further details of the transmit block 202 may be illustrated in FIG. 3.

The transmit antennas $206_1 \ldots, 206_Y$ may comprise suitable logic, circuitry, and/or code that may enable transmission of a plurality of signals in a wireless system. In one embodiment of the invention, the antennas $206_1 \ldots, 206_Y$ may enable transmission of a plurality of polar modulated signals received from the transmit blocks 202.

The RF receive blocks $212_1 \ldots, 212_M$ may comprise logic, circuitry and/or code that may enable processing of a plurality of received signals. In one embodiment of the invention, the RF receive blocks $212_1 \ldots, 212_M$ may comprise one or more direct digital frequency synthesizers which may generate signals for down-conversion and demodulation of the received signals. Further details of the receive blocks 212 may be illustrated in FIG. 5.

The receive antennas $208_1 \ldots, 208_{MN}$ may comprise suitable logic, circuitry, and or code that may enable receiving a plurality of signals in a wireless system. In one embodiment, the receive antennas $208_1 \ldots, 208_{MN}$ may enable reception of a plurality of polar modulated signals which are then processed by the receive block 212.

FIG. 3 is a block diagram of a RF transmitter, in accordance with an embodiment of the invention. FIG. 3 comprises one embodiment of the RF transmit block 202, as described FIG. 2. The RF transmit block 202 may comprise a DDFS block 302, a reference clock 304, an amplifier 306, and a processor 308.

Figure 4:
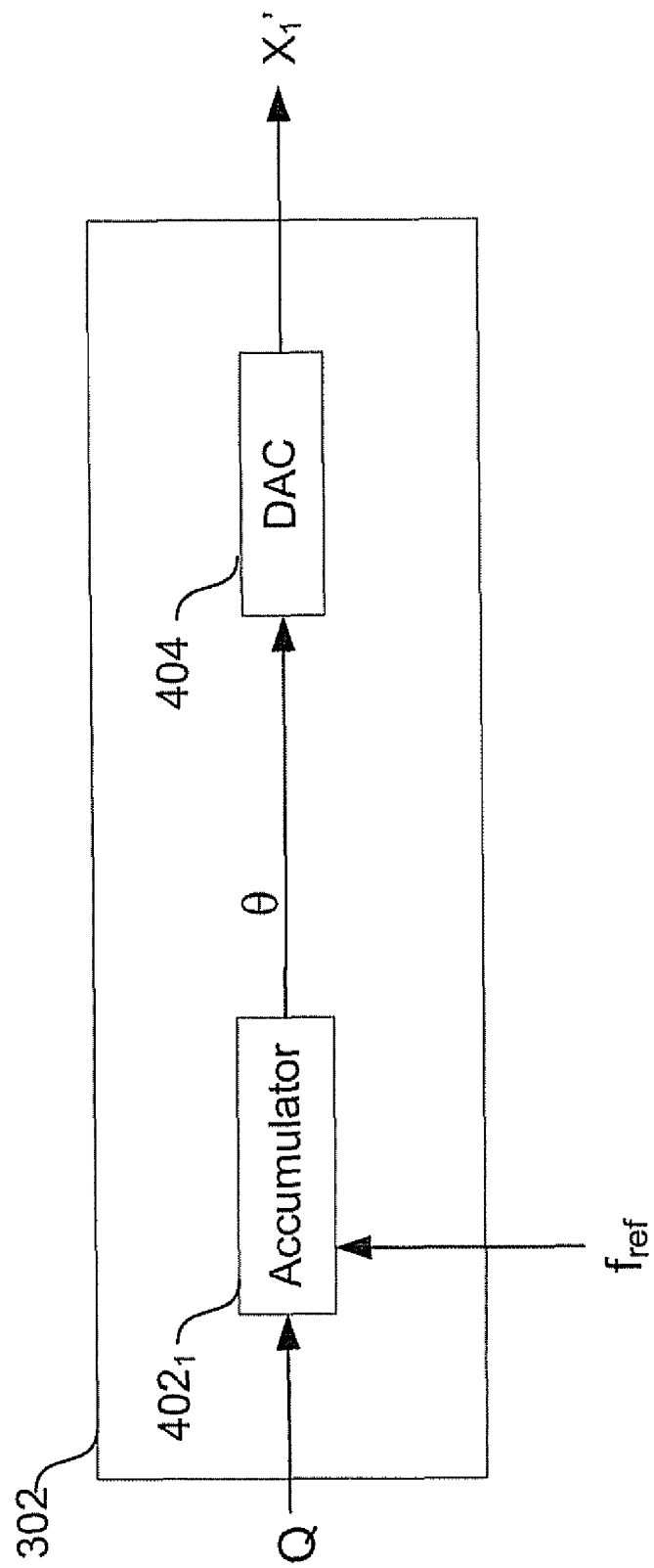
FIG. 4 is a block diagram of a direct digital frequency synthesizer utilized for transmitting polar modulated signals in a MIMO system, in accordance with an embodiment of the invention

The DDFS block 302 may comprise suitable logic circuitry and/or code that may enable generation of signals, such as $X'_1$, based on a digital control word, Q, and a signal $f_{ref}$ from the reference clock 304. The control word may be generated by the processor 308. FIG. 4 illustrates details of an exemplary DDFS block utilized to generate signals for transmitting in a MIMO system.

The reference clock 304 may comprise suitable logic circuitry and/or code that may enable generation of a reference signal, $f_{ref}$, for use by other blocks in a MIMO system, such as system 200 of FIG. 2. In one embodiment of the invention, the reference clock 304 may comprise a single crystal oscillator circuit, which may be enabled to provide a reference signal to the DDFS block 302.

The amplifier 306 may comprise suitable logic, circuitry, and/or code that may enable driving signals, such as X'$_1$, to one or more transmit antennas as shown in the system 200. In one embodiment of the invention, the amplifier 306 may enable amplification and amplitude modulation of one or more phase modulated signals.

The processor 308 may comprise suitable logic, circuitry, and/or code that may enable processing of signals for transmission in a system such as the system 200. The processor 308 may provide a digital control word to DDFS block 302 and may control a gain of amplifier 306.

In operation, the DDFS block 302 may modulate information contained in data streams D$_1$ onto one or more signals by generating one or more phase modulated carriers X'$_1$. Additionally, the amplifiers 306 may operate on X'$_1$ and may modulate information from data streams D$_1$ onto X'$_1$ by performing amplitude modulation and outputting signal X"$_1$. This amplitude modulation may be performed by varying the gain of the amplifier 306. In this manner, the RF transmit block may enable transmission of RF signals using polar modulation.

FIG. 4 is a block diagram of a direct digital frequency synthesizer utilized in transmitting polar modulated signals in a MIMO system, in accordance with an embodiment of the invention. Referring to FIG. 4, the DDFS block 302 may comprise an accumulator 402 and a digital to analog conversion (DAC) block 404.

The accumulator 402 may comprise suitable logic, circuitry, and/or code that may enable successively adding a control word Q to a value stored in the accumulator on each cycle of a reference clock. The accumulator may receive the control word Q from a processor, such as the processor 308 described FIG. 3. The accumulator 402 may also receive a signal f$_{ref}$ from a reference clock such as the reference clock 304 described in FIG. 3. In this regard, the control word Q and the reference signal f$_{ref}$ may determine a phase and/or a frequency of the output signals X'$_1$ . . . , X'$_Z$.

The DAC block 404 may comprise suitable logic, circuitry, and and/or code that may enable output of a signal of varying phase, frequency, or amplitude. In one embodiment, the DAC block 404 may comprise a number of lookup tables used to generate output signals, which may drive one or more power amplifiers, such as the amplifiers 306$_1$ . . . , 306$_Z$ described in FIG. 3.

In operation, the DDFS block 302 may be a digitally-controlled signal generator that may vary a phase, a frequency, and/or an amplitude of one or more output signals based on a single fixed-frequency reference clock of frequency f$_{ref}$ and a control word Q. In operation, the control word Q may be provided to the accumulator 402, and may be successively added to a value stored in the accumulator on each cycle of the reference clock. In this manner, the sum will eventually be greater than the maximum value the accumulator may store, and the value in the accumulator may overflow or "wrap". Accordingly, an N-bit accumulator will overflow at a frequency f$_o$ given by EQ. 1.

$$f_o = f_{ref}(Q/2^N)$$ EQ. 1

In this manner, the output of the accumulator, θ, will be periodic with period 1/f$_o$ and may represent the phase angle of a signal. Providing this phase angle to the DAC block may then allow generation of one or more signals of varying phase, frequency and amplitude. In this regard, the DDFS block 302 is well suited as a frequency generator that outputs one or more sine waves or other periodic waveforms over a large range of frequencies, from almost DC to approximately half the reference clock frequency f$_{ref}$.

Figure 5:
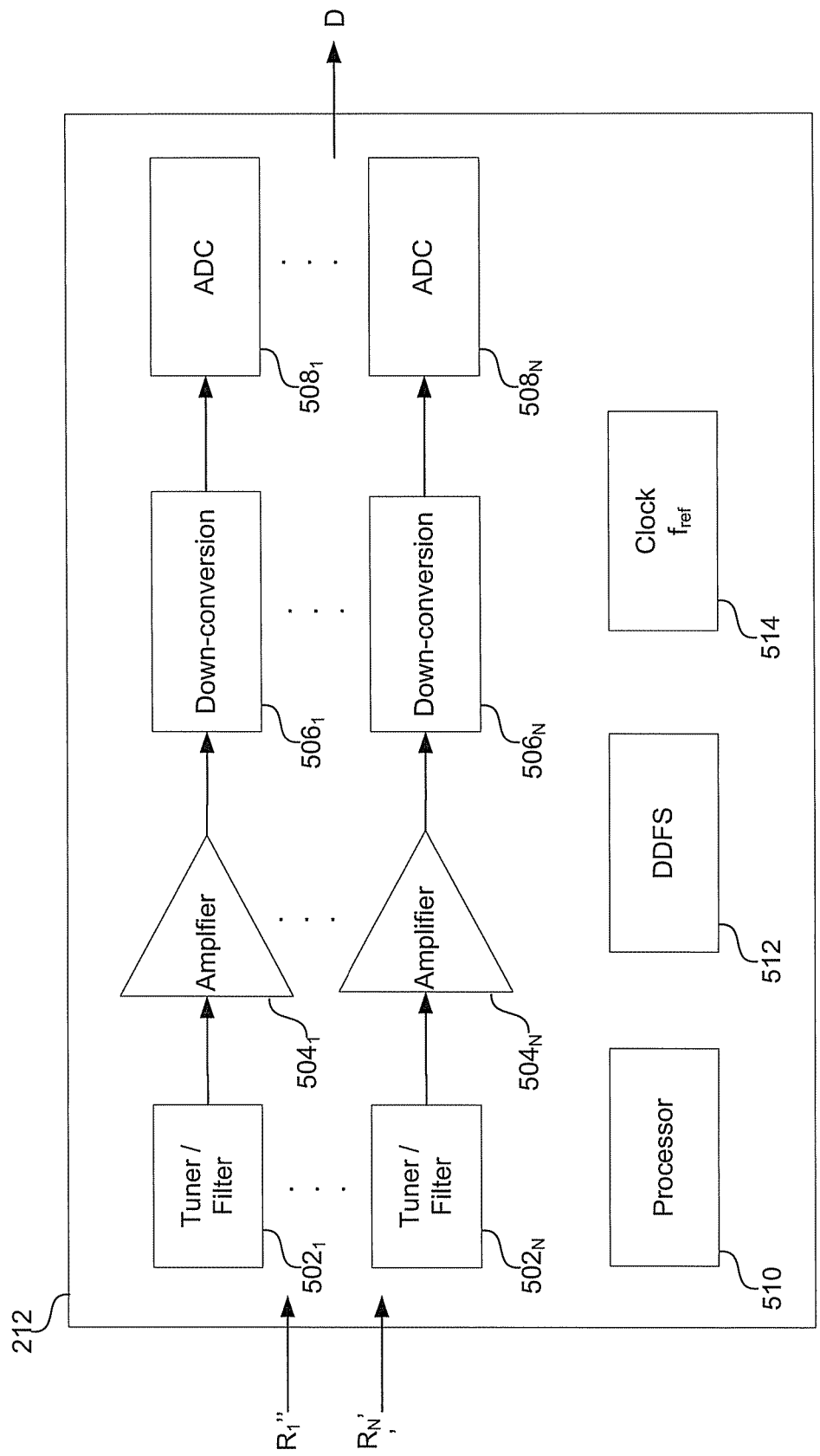
FIG. 5 is block diagram of a receiver, in accordance with an embodiment of the invention.

FIG. 5 is block diagram of a receiver in accordance with an embodiment of the invention. FIG. 5 comprises one embodiment of the RF receive block 212, as described FIG. 2. The RF receive block 212 may comprise a processor 510, a DDFS block 512, a reference clock 514, one or more tuner/filter blocks 502$_1$ . . . , 502$_N$, one or more amplifier blocks 504$_1$ . . . , 504$_N$, one or more down-conversion blocks 506$_1$ . . . , 506$_N$, one or more analog to digital conversion (ADC) blocks 508$_1$ . . . , 508$_N$.

The processor block 510 may comprise logic, circuitry, and/or code that may provide signals to the tuner/filter blocks 502$_1$ . . . , 502$_N$, the amplifier blocks 504$_1$ . . . , 504$_N$, the down-conversion blocks 506$_1$ . . . , 506$_N$, the analog to digital conversion (ADC) blocks 508$_1$ . . . , 508$_N$, the DDFS block 512, and the reference clock 514.

The DDFS block 512 may comprise suitable logic, circuitry, and/or code that may enable the generation of one or more signals to be used in processing signals. In one embodiment, the DDFS block 512 may receive a control signal from processor 510 and a reference clock 514. In this regard, the DDFS block 512 may be similar to or the same as the DDFS block 302 described in FIGS. 3 and 4.

The reference clock 514 may comprise logic, circuitry, and/or code that may enable generation of a reference signal. In one embodiment, the reference clock 514 may be utilized by the DDFS block 512 in generating of signals of varying phase, frequency, and amplitude. In this regard, the reference clock 514 may be similar to or the same as the reference clock 304 shown in FIGS. 3 and 4.

The tuner/filter blocks 502$_1$ . . . , 502$_N$ may comprise logic, circuitry, and/or code that may enable tuning to a desired frequency band and filtering out unwanted signals. In one embodiment, the tuner/filter blocks 502$_1$ . . . , 502$_N$ may receive one or more signals from processor 510 and from the DDFS block 512 to enable filtering/tuning of received signals.

The amplifier blocks 504$_1$ . . . , 504$_N$ may comprise logic, circuitry, and/or code that may enable amplification of one or more signals received from a plurality of antennas. In one embodiment, the amplifier blocks 504$_1$ . . . , 504$_N$ may receive one or more signals from the processor 510 and from the DDFS block 512 to enable amplification and amplitude modulation of one or more received signals.

The ADC blocks 508$_1$ . . . , 508$_N$ may comprise logic, circuitry, and/or code that may enable digitization and or demodulation of one or more received signals. In one embodiment, ADC blocks 508$_1$ . . . , 508$_N$ may receive signals from the processor 510 and from the DDFS block 512 to enable analog to digital conversion and demodulation of received signals.

In operation, the receiver 212 may receive a plurality of signals from receive antennas, such as the receive antennas 208$_1$ . . . , 208$_N$ shown in FIG. 2. Processing this plurality of received signals may require a large number and a wide range of frequencies, which may be generated by the DDFS block 512. One advantage of using DDFS block 512 is the ability of a DDFS block 512 to generate one or more signals, ranging in frequency from almost DC to approximately half the reference clock frequency, with high resolution. Another advantage of DDFS block 512 is that it may enjoy benefits associated with digital circuitry including scalability.

Figure 6:
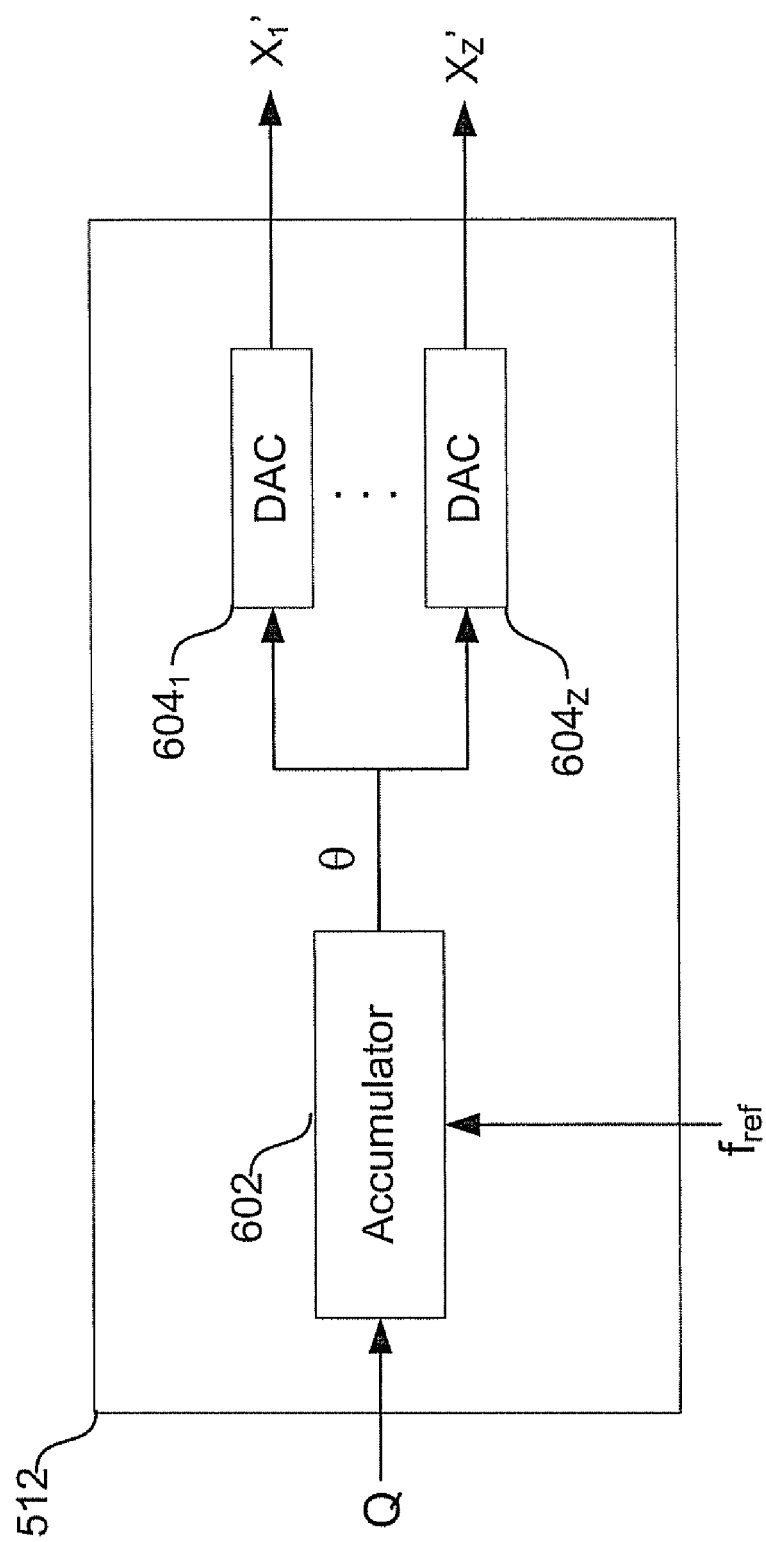
FIG. 6 is a block diagram of a direct digital frequency synthesizer utilized for receiving signals in a MIMO system, in accordance with an embodiment of the invention

FIG. 6 is a block diagram of a direct digital frequency synthesizer utilized in receiving signals in a MIMO system in accordance with an embodiment of the invention. Referring to FIG. 6, the DDFS block 512 may comprise an accumulator 602 and one or more digital to analog conversion (DAC) blocks 604$_1$ . . . , 604$_Z$.

The accumulator 602 may comprise suitable logic, circuitry, and/or code that may enable successively adding Q to a value stored in the accumulator on each cycle of a reference clock. The accumulator 602 may receive a control word from a processor, for example, the processor 308 described FIG. 3, and may also receive a signal $f_{ref}$ from the reference clock, such as the reference clock 304 described in FIG. 3. In this regard, the control word Q and the reference signal $f_{ref}$ may determine a phase and/or a frequency of the output signal $X'_1$.

The DAC blocks $604_1 \ldots, 604_Z$ may comprise suitable logic, circuitry, and and/or code that may enable output of one or more signals of varying phase, frequency, or amplitude. In one embodiment, the DAC blocks $601_1 \ldots, 601_Z$ may comprise one or more lookup tables that may be used to generate output signals, the latter of which may drive one or more blocks in a receive chain such as the tuner/filter blocks $502_1 \ldots, 502_N$, the amplifier blocks $504_1 \ldots, 504_N$ and the ADC blocks $508_1 \ldots, 508_N$ described in FIG. 5.

In operation, the DDFS block 512 generates signals in the same fashion as the DDFS block 302 described in FIG. 4. However, the DDFS block 512 may comprise one or more additional DAC blocks as compared to DDFS block 302. The multiple DAC blocks may enable the DDFS block 512 to generate multiple signals using a single accumulator. In one embodiment of the invention, the DDFS block 512 may enable generation of pairs of signals wherein each pair of generated signals may comprise signals that are 90° out of phase with each other. In this manner, the DDFS block 512 may generate local oscillator signals for quadrature down-conversion of received signals.

Figure 7:
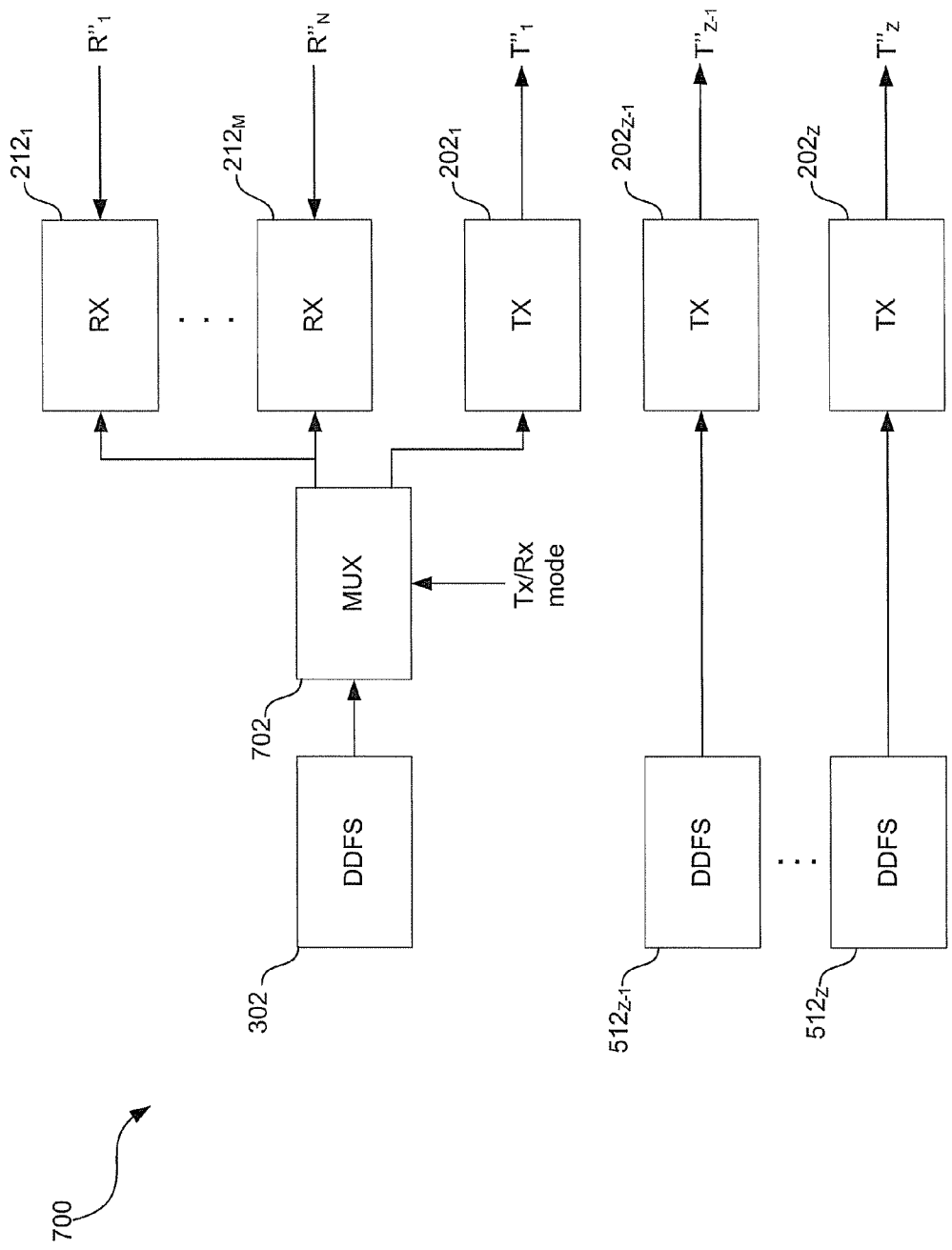
FIG. 7 is a block diagram of a TDD MIMO system, in accordance with an embodiment of the invention.

FIG. 7 is a block diagram of a time division duplexed (TDD) MIMO system, in accordance with an embodiment of the invention. Referring to FIG. 7 a TDD MIMO system 700 may comprise an instance of the DDFS block 302, one or more instances of the DDFS block 512, a plurality of the receiver block 212, a plurality of the transmit block 202, and a multiplexer 702.

The multiplexer 700 may comprise suitable logic, circuitry, and/or code that may enable routing signals from the DDFS block 302 to the plurality of receive blocks 212 or to the transmit block $202_1$, based on one or more control signals Tx/Rx mode. The remaining components of FIG. 7 are similar to and operate in the manner similar to that which is described with respect to FIG. 1 through FIG. 6.

In operation, the TDD system has Z transmit channels and M receive channels, however, since the system is either transmitting or receiving and not doing both simultaneously, then the system 700 may require only Z DDFS blocks. The DDFS outputs may be routed to the appropriate transmit or receive blocks utilizing by the multiplexer 701, and the appropriate path through the multiplexer may be selected by a control signal, Tx/Rx mode. In one embodiment of the invention, when the system is transmitting, the DDFS block 302 may be utilized to generate reference signals for the transmit block $202_1$, and when the system is receiving, the DDFS block 302 may be utilized to generate reference signals for the plurality of receive blocks $212_1, \ldots, 212_M$. In various other embodiments of the invention, one of more of the DDFS blocks 512 may be multiplexed and used to generate one or more reference signals for the plurality of receive blocks $212_1 \ldots, 212_M$.

Aspects of the invention may be found in a method and system for transmitting a plurality of signals in a multiple-input-multiple-output (MIMO) system using polar modulation, that is, the signals are separately phase modulated and amplitude modulated. In this regard, one or more direct digital frequency synthesizers such as DDFS block 302 may enable phase modulation of these carrier signals. A gain of one or more amplifiers may be controlled so as to enable amplitude modulation of the phase modulated signals. In generating the phase modulated signals, the DDFS block 302 may use one or more reference clock signals. In this regard, the DDFS block 302 may utilize a single reference clock comprising, for example a fixed frequency, to generate all necessary signals.

Further aspects of the invention may be found in a method and system for receiving a plurality of signals in a multiple-input-multiple-output (MIMO) system DDFS block 302 to generate one or more reference frequencies, such as local oscillator (LO) frequencies. In this regard, one or more direct digital frequency synthesizers such as DDFS block 302, may enable down-conversion and demodulation of the received signals. In generating the reference signals the DDFS block 302 may use one or more reference clock signals. In this regard, the DDFS block 302 may utilize a single reference clock comprising, for example a fixed frequency, to generate all necessary signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
generating a first oscillating signal via one or more first direct digital frequency synthesizers of a communication device, wherein the communication device comprises a plurality of receive channels, a plurality of transmit channels, and a multiplexer, and the first oscillating signal is coupled, via the multiplexer, to the plurality of receive paths and one of the transmit paths;
generating one or more second oscillating signals via one or more second direct digital frequency synthesizers of the communication device;

processing, in the communication device, signals received via a plurality of antennas utilizing the first oscillating signal; and processing, in the communication device, signals to be transmitted via the plurality of antennas utilizing the first oscillating signal and the one or more second oscillating signals.

2. The method according to claim 1, wherein, during time intervals in which the communication device is configured to receive signals via the plurality of antennas, the multiplexer routes the first oscillating signal from the one or more first direct digital frequency synthesizers.

3. The method according to claim 1, wherein, during time intervals in which the communication device is configured to transmit signals via the plurality of antennas, each of the one or more transmit paths utilizes a different one of the one or more second oscillating signals.

4. The method according to claim 1, wherein the processing of the signals received via the plurality of antennas comprises demodulating the signals received via the plurality of antennas.

5. The method according to claim 1, wherein the processing of the signals to be transmitted via the plurality of antennas comprises modulating the signals to be transmitted via the plurality of antennas.

6. The method according to claim 1, wherein each of the one or more first direct digital frequency synthesizer comprises a single accumulator and a plurality of lookup tables.

7. The method according to claim 1, wherein each of the one or more second direct digital frequency synthesizers comprises a single accumulator and a plurality of lookup tables.

8. The method according to claim 1, comprising configuring the multiplexer based on whether the communication device is transmitting or receiving.

9. The method according to claim 1, wherein the one or more first direct digital frequency synthesizers and the one or more second direct digital frequency synthesizers are driven by a single reference clock.

10. A system comprising:
one or more circuits for use in a communication device, the one or more circuits comprising:
one or more first direct digital frequency synthesizers;
one or more second direct digital frequency synthesizers; and
a multiplexer;
the one or more circuits being operable to:
generate a first oscillating signal via the one or more first direct digital frequency synthesizers, wherein the first oscillating signal is coupled, via the multiplexer, to a plurality of receive paths and at least one transmit path;
generate one or more second oscillating signals via the one or more second direct digital frequency synthesizers;
process signals received via a plurality of antennas utilizing the first oscillating signal; and
process signals to be transmitted via the plurality of antennas utilizing the first oscillating signal and the one or more second oscillating signals.

11. The system according to claim 10, wherein, during time intervals in which the communication device is configured to receive signals via the plurality of antennas, the multiplexer routes the first oscillating signal from the one or more first direct digital frequency synthesizers.

12. The system according to claim 10, wherein, during time intervals in which the communication device is configured to transmit signals via the plurality of antennas, each of the one or more transmit paths utilizes a different one of the one or more second oscillating signals.

13. The system according to claim 10, wherein the processing of the signals received via the plurality of antennas comprises demodulating the signals received via the plurality of antennas.

14. The system according to claim 10, wherein the processing of the signals to be transmitted via the plurality of antennas comprises modulating the signals to be transmitted via the plurality of antennas.

15. The system according to claim 10, wherein each of the one or more first direct digital frequency synthesizer comprises a single accumulator and a plurality of lookup tables.

16. The system according to claim 10, wherein each of the one or more second direct digital frequency synthesizers comprises a single accumulator and a plurality of lookup tables.

17. The system according to claim 10, wherein the one or more circuits are operable to configure the multiplexer based on whether the communication device is transmitting or receiving.

18. The system according to claim 10, wherein the one or more first direct digital frequency synthesizer and the one or more second direct digital frequency synthesizers are driven by a single reference clock.

19. A communication device comprising:
a first direct digital frequency synthesizer operable to generate a first oscillating signal;
a second direct digital frequency synthesizer operable to generate one or more second oscillating signals;
a multiplexer operable to couple the first oscillating signal to one or more receive paths and one or more transmit paths, wherein the multiplexer is configured based on whether the communication device is transmitting or receiving; and
a processor operable to:
process signals received via a plurality of antennas utilizing the first oscillating signal; and
process signals to be transmitted via the plurality of antennas utilizing the first oscillating signal and the one or more second oscillating signals.

20. The communication device according to claim 19, wherein each of the one or more transmit paths utilizes a different one of the one or more second oscillating signals, while the communication device is transmitting.

* * * * *